(No Model.)

A. A. DAVIS.
APPLIANCE FOR RAISING DOUGH.

No. 495,024. Patented Apr. 11, 1893.

Witnesses:
Ralph C. Enyart
Mary L. Murray

Inventor:
Abbott A. Davis
By Geo. J. Murray
his Attorney

UNITED STATES PATENT OFFICE.

ABBOTT A. DAVIS, OF CINCINNATI, OHIO, ASSIGNOR OF ONE-HALF TO JAMES H. RUST, OF COVINGTON, KENTUCKY.

APPLIANCE FOR RAISING DOUGH.

SPECIFICATION forming part of Letters Patent No. 495,024, dated April 11, 1893.

Application filed October 19, 1892. Serial No. 449,319. (No model.)

*To all whom it may concern:*

Be it known that I, ABBOTT A. DAVIS, a citizen of the United States, and a resident of Cincinnati, in the county of Hamilton and State of Ohio, have invented certain new and useful Improvements in Appliances for Raising Dough, of which the following is a specification.

My invention relates to dough raisers. Its object is to provide a compact convenient device for raising dough, which requires no attention from the time the dough is placed in it until it is ready to be made into loaves for baking.

The invention will be first fully described in connection with the accompanying drawings, and then particularly referred to and pointed out in the claim.

Figure 1:
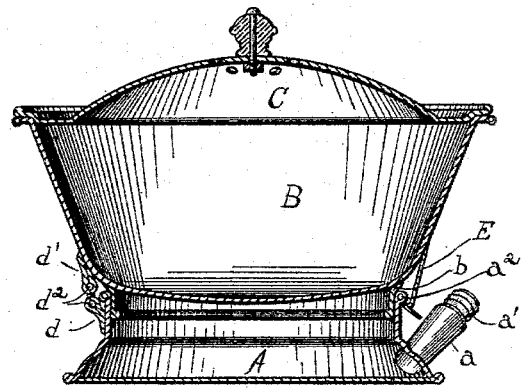
Figure 2:
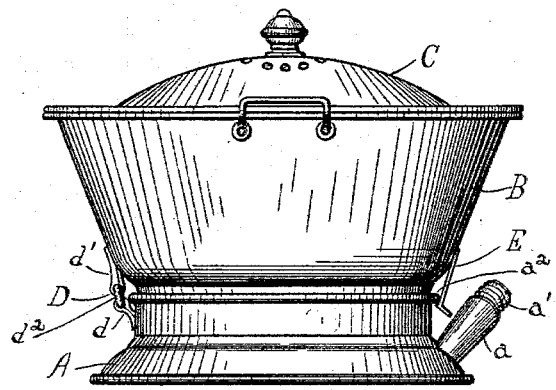

Referring to the drawings, in which like parts are indicated by similar reference letters wherever they occur throughout the various views: Figure 1 is a vertical diametrical sectional view of my improved device. Fig. 2 is a side elevation of the same.

Referring to the parts by reference letters, A is the base, B the dough receiving vessel, and C the removable cover. The vessels are preferably made of tin. The lower vessel or base A is an open-top vessel provided with a spout, $a$, at one side, which has an air tight screw-cover, $a'$. The vessel B is provided with a downwardly projecting flange, $b$, which is adapted to fit snugly within the open mouth of the base or lower vessel A. The two vessels A and B are united by a hinge D, preferably formed in two loops, $d$, $d'$, one of which is secured to the base A and the other to the vessel B, and a wire link $d$, $d^2$, around the opposite bars of which the loops $d$, $d'$, are turned. The ends of the loops are secured respectively to the upper vessel B and the lower vessel A by solder or other suitable means.

To the wall of the vessel B diametrically opposite the hinge is secured a spring catch E, the angular free end of which snaps over a bead, $a^2$, formed near the top of the base A, and holds the two vessels together.

The top or cover C is centrally provided with a knob or handle, $c$, and around the central knob the top has a series of perforations, $c'$, to permit the escape of the gases driven off in the process of fermentation.

The operation of my device is as follows: The dough to be raised is placed in the vessel B, the cover is placed in position, then the screw-cap, $a'$, is removed from the spout, and water at about the boiling point is introduced into the base A until it is about one-half or two-thirds full; the cap, $a'$, is then replaced, and the device set to one side until the dough is ready to be kneaded and put into the baking pans. This usually requires from two to three hours, but no further attention is required.

The upper and lower vessels may of course be rigidly secured together but it is a great convenience to hinge them as shown, for the purpose of cleansing the lower vessel.

What I claim as new, and desire to secure by Letters Patent, is—

The combination substantially as shown and described, of the two vessels A and B, the hinge uniting them, the spring catch to hold them in the closed position, the spout, $a$, and cap, $a'$, for the lower vessel, and the perforated cover C.

ABBOTT A. DAVIS.

Witnesses:
JAMES H. RUST,
GEO. J. MURRAY.